United States Patent
Kivelä et al.

(10) Patent No.: US 8,319,670 B2
(45) Date of Patent: Nov. 27, 2012

(54) INPUT ARRANGEMENT

(75) Inventors: Kim Kivelä, Alatemmes (FI); Jarkko Vatjus-Anttila, Oulu (FI)

(73) Assignee: Elektrobit Wireless Communications Oy, Oulu (FI)

( * ) Notice: Subject to any disclaimer, the term of this patent is extended or adjusted under 35 U.S.C. 154(b) by 489 days.

(21) Appl. No.: 12/601,696

(22) PCT Filed: Jun. 12, 2007

(86) PCT No.: PCT/FI2007/050347
§ 371 (c)(1),
(2), (4) Date: Dec. 2, 2009

(87) PCT Pub. No.: WO2008/152179
PCT Pub. Date: Dec. 18, 2008

(65) Prior Publication Data
US 2010/0164759 A1    Jul. 1, 2010
US 2010/0328107 A2    Dec. 30, 2010

(51) Int. Cl.
*H03M 11/02* (2006.01)
(52) U.S. Cl. ............ 341/22; 341/33; 341/341; 341/34
(58) Field of Classification Search ........... 341/22, 341/27, 32, 33, 34
See application file for complete search history.

(56) References Cited

U.S. PATENT DOCUMENTS

| 7,091,886 | B2 * | 8/2006 | DePue et al. ............ 341/33 |
| 7,468,573 | B2 * | 12/2008 | Dai et al. ............ 310/317 |
| 2003/0222536 | A1 | 12/2003 | Morton et al. |
| 2004/0100440 | A1 | 5/2004 | Levin et al. |
| 2005/0057528 | A1 | 3/2005 | Kleen |
| 2007/0296702 | A1 | 12/2007 | Strawn et al. |
| 2008/0087476 | A1 * | 4/2008 | Prest et al. ............ 178/18.01 |

FOREIGN PATENT DOCUMENTS

| EP | 1513049 A2 | 3/2005 |
| JP | 7181051 A | 7/1995 |
| JP | 2007055551 A * | 3/2007 |

OTHER PUBLICATIONS

Jacek Drabko, Supplementary European Search Report for corresponding European Patent Appl. No. EP07788739, pp. 1-2 (Aug. 22, 2011).

* cited by examiner

*Primary Examiner* — Howard Williams
(74) *Attorney, Agent, or Firm* — Hoffmann & Baron LLP

(57) ABSTRACT

The invention provides an input device of an electric apparatus and a method of manufacturing an input device, wherein the input device comprises: a key member for receiving an input from a user, the key member comprising a plurality of circumferentially arranged touch-sensitive sensor segments and having at least one degree of freedom with respect to the body of the electric apparatus; and a feedback unit coupled to the key member and configured to generate feedback to the key member in the direction of the at least one degree of freedom as a response to the input.

13 Claims, 4 Drawing Sheets

US 8,319,670 B2

INPUT ARRANGEMENT

CROSS-REFERENCE TO RELATED APPLICATION

This application is a National Phase application of International Application No. PCT/FI2007/050347, filed Jun. 12, 2007, which is incorporated herein by reference.

BACKGROUND

1. Field

The invention relates to an input arrangement of an electronic device and a method of manufacturing an input device.

2. Description of the Related Art

Input devices of electronic devices are typically implemented with multi-dimensional mechanical switch structures such as rocker keys and scroll keys. A rocker key involves a plurality of supporting axes around which the rocker key may be rocked in order to navigate in graphical menu structures. A scroll key involves a rotational motion of a mechanical wheel, which typically gives rise to a pointer being scrolled on a screen.

The problem with the prior art input devices is that they involve moving parts and are therefore prone to mechanical failures. Therefore it is worth-while to consider improvements for input arrangements of electronic devices.

SUMMARY

An object of the invention is to provide an improved input arrangement and a method of manufacturing such an input device. According to a first aspect of the invention, there is provided an input arrangement of an electric apparatus, wherein the input arrangement comprises an input device which includes: a key member for receiving an input from a user, the key member comprising a plurality of circumferentially arranged touch-sensitive sensor segments and having at least one degree of freedom with respect to the body of the electric apparatus; and a feedback unit coupled to the key member and configured to generate feedback to the key member in the direction of the at least one degree of freedom as a response to the input.

According to another aspect of the invention, there is provided a method of manufacturing an input device of an electric apparatus, wherein the method comprises: forming a plurality of circumferentially arranged touch-sensitive sensor segments in a key member; placing a feedback unit to the input device; and mounting the key member in the input device, thus enabling an input to be received by the key member from a user and placed with respect to the feedback unit so as to forward the feedback effect generated by the feedback unit to the contact surface.

The invention provides several advantages.

In an embodiment of the invention, there is provided an input arrangement which includes an endless scrolling mechanism with no moving parts and a feedback mechanism for providing the user with a feedback as a response to an input.

BRIEF DESCRIPTION OF THE DRAWINGS

In the following, the invention will be described in greater detail with reference to the embodiments and the accompanying drawings, in which.

DETAILED DESCRIPTION

Figure 1:
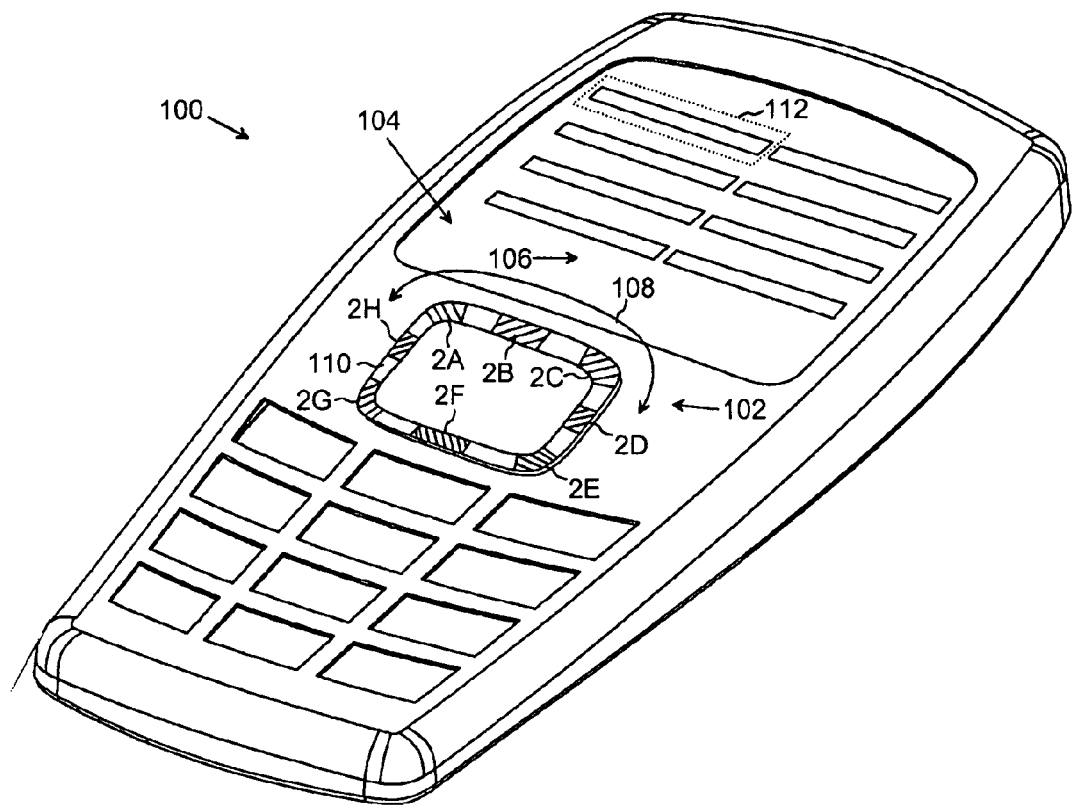
FIG. 1 shows a first example of an electric apparatus with an input arrangement according to an embodiment of the invention.

With reference to FIG. 1, examine an example of an electric apparatus 100 comprising an input device 102. The electric apparatus 100 may be a portable electric apparatus, such as a mobile phone or a laptop or a portable audio/video player, for example.

FIG. 1 shows a key member 110 which typically forms the visible part of the input device 102. The key member comprises circumferentially arranged touch-sensitive sensor segments 2A, 2B, 2C, 2D, 2E, 2F, 2G, 2H.

FIG. 1 further shows a menu structure 106 on the display 104 of the electric apparatus 100. The circumferentially arranged touch-sensitive sensor segments 2A to 2H and the associated control electronics and software may be configured so that when the user provides an input act by moving his or her finger along the trajectory 108 of the touch-sensitive sensor segments 2A to 2H, an indicator 112 moves in the menu structure 106.

In a circumferential configuration, the touch-sensitive sensor segments 2A to 2H are arranged sequentially one after the other along an imaginary arc, thus providing a logical trajectory along which the user may move his or her finger. The touch-sensitive sensor segments 2A to 2H may be arranged according to a circular arc or an elliptical arc, for example. In an embodiment of the invention, the touch-sensitive sensor segments 2A to 2H are arranged according to an arc of a rectangle with rounded corners.

The touch-sensitive sensor segments 2A to 2H are electrical components having an electric response to the close presence of material having a permittivity different from the air permittivity. Thus, when material, such as the user's finger, is brought to the proximity of a touch-sensitive sensor segment 2A to 2H, the electric characteristics of the touch-sensitive sensor segment 2A to 2H change which may be detected.

In an embodiment of the invention, the touch-sensitive sensor segments 2A to 2H are capacitive sensors which contribute to electric characteristics of a capacitance-sensitive circuit. The user's finger with permittivity different from the air permittivity alter electric characteristics, such as the nominal capacitance, of the capacitance-sensitive circuit. The change in the electric characteristics may be digitized and transformed into pointing information, which may be used for controlling functions of the electric apparatus 100. Such functions may be associated with moving display objects on the display, selecting menu items or providing commands.

The touch-sensitive sensor segments 2A to 2H and/or the associated control electronics and software may be configured so that a physical contact between the user's finger and a touch-sensitive sensor segment 2A to 2H is not necessary for proper operation of the touch-sensitive sensor segments 2A to 2H.

The circumferential configuration of the touch-sensitive sensor segments 2A to 2H provides the user with an endless selection mechanism, which may replace a mechanical scroll mechanism. The advantage of the current solution is that the endless selection mechanism does not involve moving parts which are prone to mechanical failure due to wear and tear, and dirt, for example.

Figure 2:
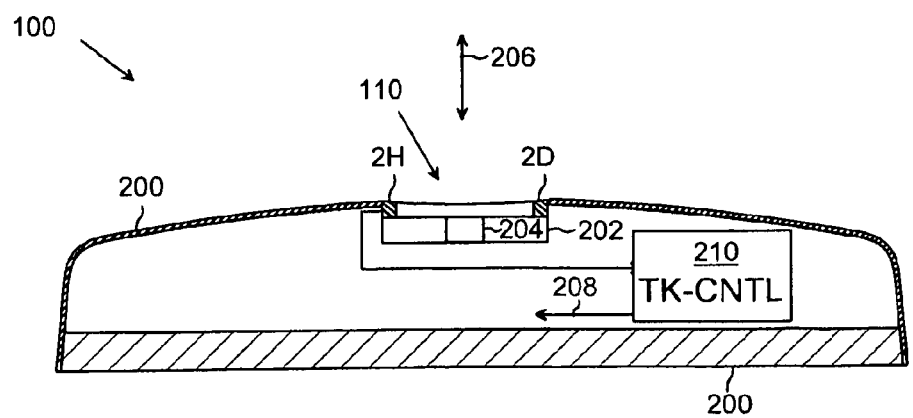
FIG. 2 shows a second example of an electric apparatus with an input arrangement according to an embodiment of the invention.

With reference to FIG. 2, a cut view of the electric apparatus 100 illustrates an input device housing 202 and a feedback unit 204.

The key member 110 is supported with respect to the device housing 202 or the body 200 of the electric apparatus 100 so the key member is mobile in at least one degree of freedom 206. The degree of freedom in this context means possible directions in which the key member 110 or a part of the key member 110 may move with respect to the electric apparatus 100.

The feedback unit 204 generates feedback to the key member 100 in the direction of the degree of freedom 206 as a response to an input by the user. The feedback is forwarded to the user's finger or pointing device, which may interpret the feedback as a successful input.

FIG. 2 further shows a touch-key controller (TK-CNTL) 210, which is connected to the touch-sensitive sensor segments 2A to 2H. The touch key controller 210 detects the difference in the electric characteristics of the touch-sensitive sensor segments 2A to 2H induced by the user's acts on the key member 110 and transforms the difference into a digital output 208. The digital output 208 may be taken to the processing unit of the electric apparatus 100.

The touch key controller 210 may comprise the capacitance-sensitive electric circuit and a digitizer. The capacitance-sensitive electric circuit may be based on an RLC circuit whose current-voltage characteristics depend on the capacitance of a touch-sensitive sensor segment 4A to 4H. The change in the current voltage characteristics may be measured, and the result may be digitized in an analogue-to-digital converter.

The capacitive-sensitive electric circuit charges and discharges capacitive sensor elements of the touch-sensitive sensor segment 4A to 4H. The number of charging cycles is measured over a predetermined time period. The number of charge-discharge cycles changes in a predictable way over a certain time period when the user's finger is in the proximity of any touch-sensitive sensor segment 4A to 4H. This change can be measured, and the capacitive-sensitive electric circuit can inform the system about the presence of the user's finger, or changes in the presence of the user's finger.

The touch-key controller 210 may be implemented with ASIC (Application-Specific Integrated Circuit) and software, for example.

Figure 3:
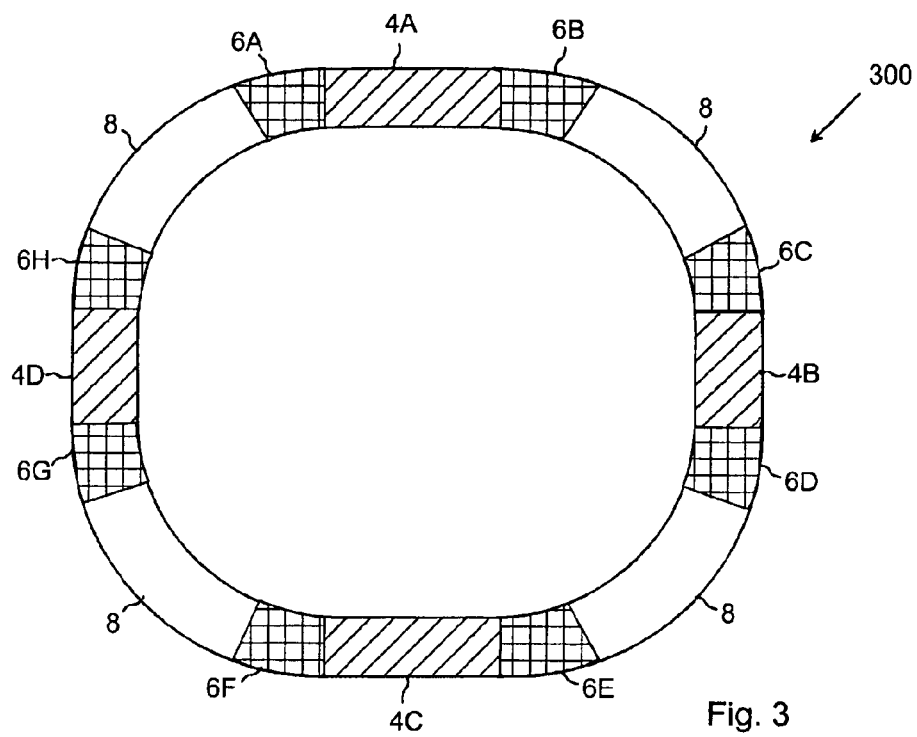
FIG. 3 shows a first example of an input device according to an embodiment of the invention.

FIG. 3 shows a key member 300 with 4 circumferentially arranged touch-sensitive sensor segments 4A, 4B, 4C, 4D.

In an embodiment of the invention, the key member 300 comprises grounded segments 8 between the touch-sensitive sensor segment 2A to 2H. The grounded segments 8 may be connected to the ground, such as the body 200 of the electric apparatus 100. The grounded segments 8 increase the sensitivity of the touch-sensitive sensor segment 2A to 2H and decrease interference effects.

In an embodiment of the invention, the key member 300 comprises insulating segments 6A to 6H between the touch-sensitive sensor segment 2A to 2H and the grounded segments 8. The insulating segments 6A to 6H may be made of insulating material, such as plastic, and provide an electric isolation between the touch-sensitive sensor segment 2A to 2H and the grounded segments 8. The electric isolation improves the sensitivity of the touch-sensitive sensor segments 2A to 2H.

Figure 4:
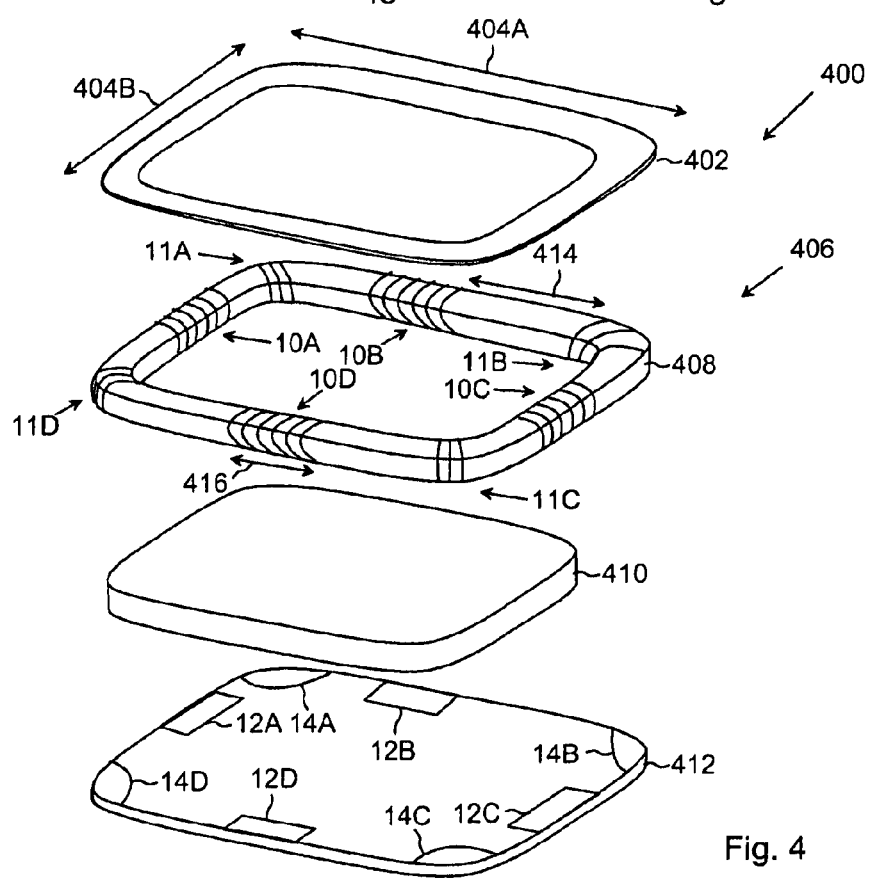
FIG. 4 shows an exploded view of an example of a key member according to an embodiment of the invention.

FIG. 4 shows an exploded view of an embodiment of a key member 400. The key member 400 comprises a bottom plate 412, an electric layer 406, a support member 410 and a cover film 402.

The electric layer 406 comprises an arc-like support structure 408, which provides support for sensor segments and ground segments. FIG. 4 shows sensor segments implemented with wire sensors 10A, 10B, 10C, 10D which form a coil-like structure around the arc-like support structure 408. Each wire sensor 10A to 10D may be coupled to the capacitance-sensitive electric circuit by connection wires or by means of sensor contacts 12A, 12B, 12C, 12D formed on the bottom plate 412. The wire sensors 10A to 10D are brought into electric contact with the sensor contacts 12A to 12D when the key member 300 is assembled. The bottom plate may 412 comprise a bus not shown in FIG. 4 connected to the sensor contacts, wherein the bus may be coupled to the touch-key controller (TK-CNTL) 210. The sensor contacts 12A to 12D may be implemented with metal plates or films, for example.

The arc-like support structure may be manufactured from an insulating material such as plastic.

The bottom plate 412 may be made of plastic, for example. In an embodiment of the invention, the bottom plate 412 is integrated into a circuit board of the electric apparatus.

In an embodiment of the invention, the ground segments are implemented with ground wires 11A, 11B, 11C, 11D. The ground wires 11A, 11B, 11C, 11D may be coupled to the ground with a wire connection or through ground contacts 14A, 14B, 14C, 14D formed on the bottom plate 412. The wire structure of the wire sensors 10A to 10D and/or ground wires 11A to 11D may be manufactured by winding wire around the arc-like support structure 408, for example.

The use of wires in the implementation of sensor segments and/or ground segments enables using relatively narrow sensor segments and/or ground segments. The width 416 of the wire sensors 10A to 10D and/or the ground segments 11A to 11D may be of the order of millimeters. The distance 414 between the wire sensors 10A to 10D and the ground wires 11A to 11D may be of the order of millimeters.

In an embodiment of the invention, the physical dimensions 404A, 404B of the key member 400 are of the order of the width of a human finger. The width of the human finger is typically around 15 mm.

The support member 410 is dimensioned so as to fit into the arc-like support structure 408. The support member 410 provides stiffness for the key member so that the mechanical feedback is properly transmitted from the bottom plate to the cover film 402 when the key member 400 has been assembled. The support member 410 may be made from plastic.

In an embodiment of the invention, the support member 410 is made from flexible material. The flexibility may be chosen such that sufficient support is provided for the arc-like support structure and the feedback is trans-ferred physically through the support member 410 based on the bending of the support member 410.

The cover film 402 is preferably made of electrically insulating material such as plastic. The thickness of the cover film 402 is preferably of the order of a millimetre. A thin cover film 402 provides more capacitive sensor sensitivity. Material selection of the cover film 402 may also affect the sensitivity of the sensor elements. The best sensitivity in this particular application is reached when the film thickness is less than 1 mm, preferably less than 0.5 mm. The purpose of the film cover 402 is to act as a contact surface between the user and the electric layer 408 and to protect the electric layer 408 from dirt and wear.

In an embodiment of the invention, the feedback element 204 is integrated into the bottom plate 412. The feedback element 204 may be coupled with the support member 410 which may move in the arc-like support structure 408 and transfer the mechanical feedback to the cover film 402. The key member 400 may be assembled with plastic moulding techniques.

Figure 5:
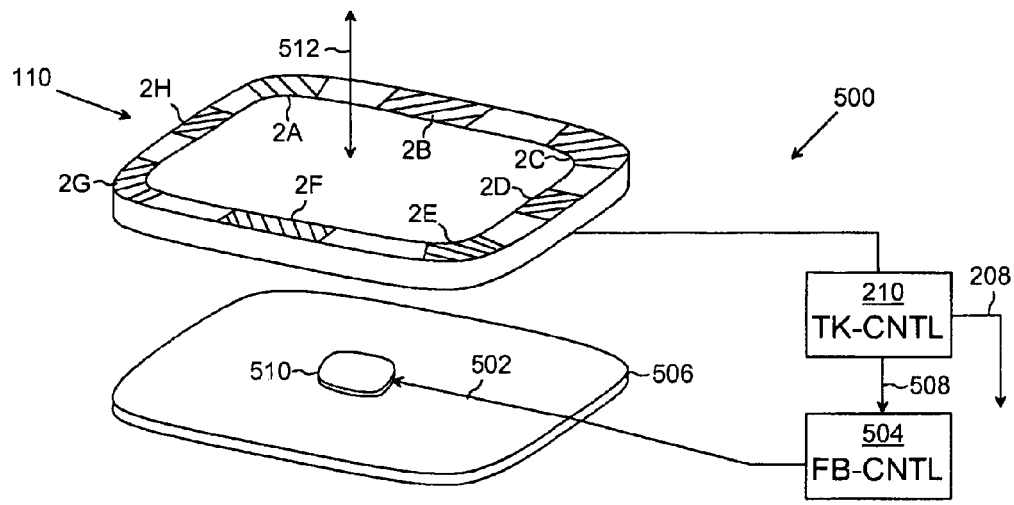
FIG. 5 shows an exploded view of an input arrangement according to a first embodiment of the invention.

With reference to an embodiment of FIG. 5, the feedback unit 510 of the input arrangement 500 generates the feedback as a response to an input via the touch-sensitive sensor segments 2A to 2H. The electric apparatus may comprise a feedback controller 504 which receives input information 508 from the touch-key controller 210 or from the processing unit of the electric apparatus. The input information 508 comprises information on an input which is required to be acknowledged to the user.

The feedback controller 504 generates a feedback signal 502 which is inputted into the feedback unit 510. The feedback element 510 generates a physical feedback effect, such as vibration, which is transferred to the user through the key member 110. The vibration may take place in the direction 512 of the degree of freedom.

The feedback controller 504 may be implemented with ASIC (Application-Specific Integrated Circuit) and software, for example. It may be integrated with the touch-key controller 210.

The feedback unit 510 may be based on a piezo element, which generates a vibration sensation to the user's finger.

The feedback unit 510 may be installed on a support plate 506, which may be integrated with the bottom plate 412 of FIG. 4.

Figure 6:
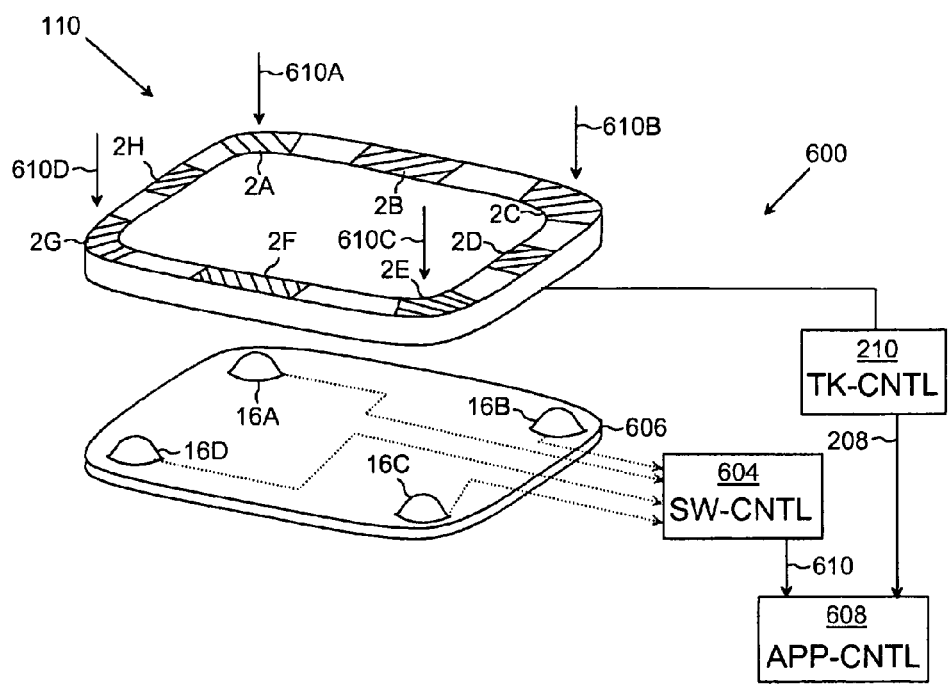
FIG. 6 shows an exploded view of an input arrangement according to a second embodiment of the invention.

With reference to an embodiment of FIG. 6, the key member 110 of the input arrangement 600 is configured to receive a switching force 610A, 610B, 610C, 610D from the user. The key member 110 forwards the switching force 610A to 610B to switches 16A, 16B, 16C, 16D, which receive the switching motion from the key member 110. In this case, there are at least two independent degrees of freedom, which allow the user to rock the key member 110.

FIG. 6 further shows a switch controller (SW-CNTL) 604 and an application controller (APP-CNTL) 608. The switch controller receives switching information from the switches 16A to 16B and inputs the switching information 610 to the application controller 608. The application controller 608 may also receive the digital output 208 from the touch-key controller 210. The application controller 608 interprets the switching information 610 and the digital output 208 and controls an application, such as a display application, accordingly.

Figures 7A, 7B:
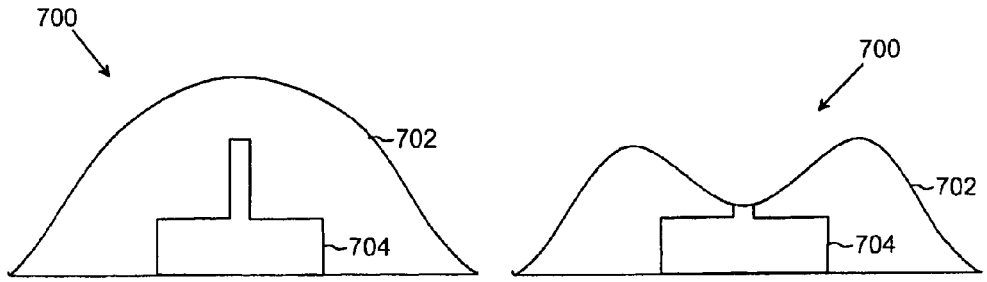
FIG. 7A shows an example of a switch structure in a first position.
FIG. 7B shows an example of a switch structure in a second position.

With reference to FIGS. 7A and 7B, the switches 704 may be integrated into a switch structure 700, which further comprises a passive feedback element 702. The passive feedback element 702 may comprise a dome, which provides a snap action when the dome is pressed beyond a threshold position shown in FIG. 7B. The switch 704 and the dome may be positioned and dimensioned so that the snap action takes place when the switching position of the switch is changed, thus informing the user about a successful switching. The snap action is transferred to the user through the key element 110.

With further reference to FIG. 6, the switches 16A to 16D may be installed on a support plate 606, which may be integrated into the bottom plate 412 of FIG. 4.

Figure 8:
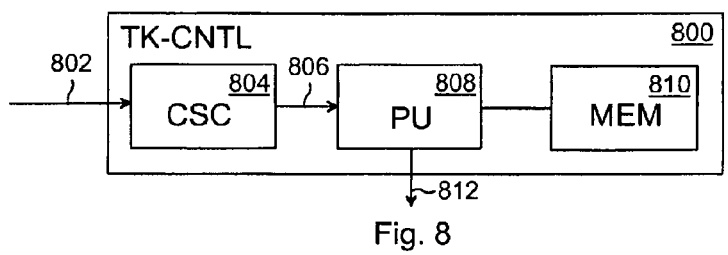
FIG. 8 shows an example of a touch-key controller.

With reference to FIG. 8, the touch-key controller 800 comprises a capacitive-sensitive circuit (CSC) 804, a processing unit (PU) 808 and a memory unit (MEM) 810.

The capacitive-sensitive circuit 804 detects an electric response signal 802 from the touch-sensitive sensor segments 2A to 2H and transforms the electric response signals to a digital signal 806. The capacitive-sensitive circuit 804 may comprise a signal generator for generating an AC signal and a measurement arrangement for measuring voltage and/or current of the signal.

The digital signal 806 is received by the processing unit 808.

The processing unit 808 processes the digital signal 806 according to encoded instructions stored in the memory unit 810.

In an embodiment of the invention, the processing unit 808 combines electric responses of at least two touch-sensitive sensor segments 2A to 2H and forms input information according to the combination.

In an embodiment of the invention, the processing unit 808 detects the circular direction of the input act by combining electric responses of touch-sensitive sensor segments 2A to 2H. The processing unit 808 generates a digital signal 812 indicating the direction.

The processing unit 808 may calculate numerical values for the capacitance of successive touch-sensitive sensor segments 2A to 2H and deduce the direction of rotation from the change of values of the capacitances. The digital signal 812 may be inputted to an application which moves a pointer in a menu structure, for example.

In an embodiment of the invention, the processing unit 808 detects a simultaneous input act of at least two touch-sensitive sensor segments 2A to 2H and generates a digital signal 812 indicating the simultaneous input act.

The simultaneous input act may result from a simultaneous finger press of several touch-sensitive sensor segments 2A to 2H. If the digital signal 812 indicates the press of touch-sensitive sensor segments 2A to 2H on the entire circumference of the key member 110, the digital signal 812 may be interpreted as a center press of the key member 110.

If the digital signal 812 indicates the press of touch-sensitive sensor segments 2A to 2H in a portion of the circumference of the key member, the digital signal may 812 be interpreted as a rocker key detection.

Figure 9:
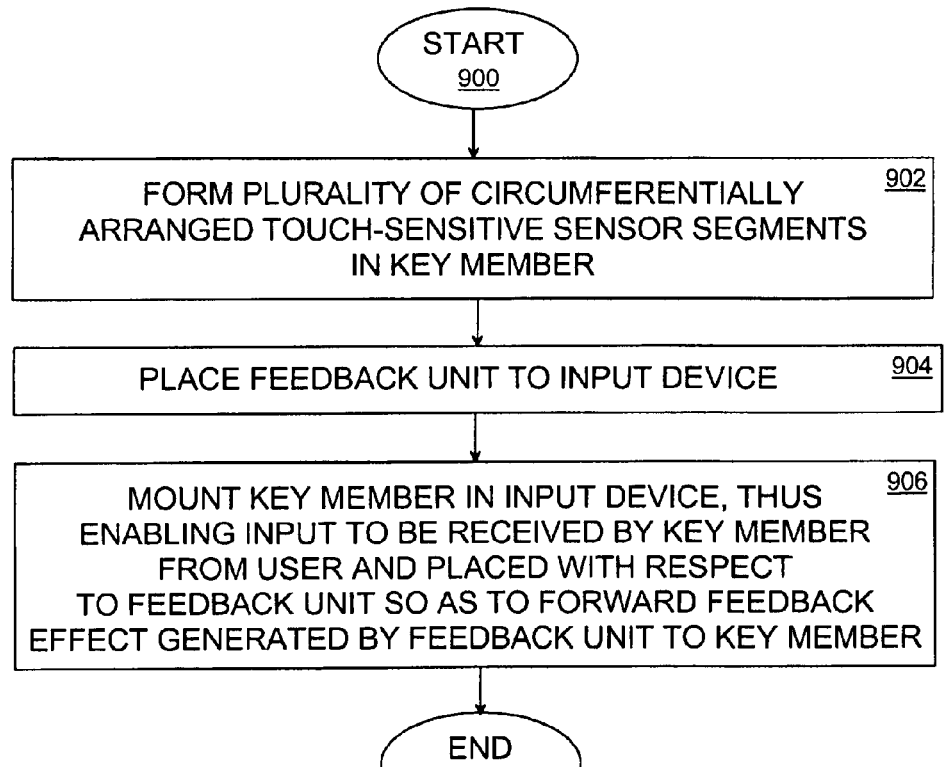
FIG. 9 shows an example of a methodology of manufacturing an input device.

FIG. 9 illustrates a method of manufacturing an input device of an electric apparatus.

In 900, the method starts.

In 902, a plurality of circumferentially arranged touch-sensitive sensor segments 2A to 2H are formed in a key member 110.

In 904, a feedback unit 510,702 is placed into the input device.

In 906, the key member 110 is mounted in the input device, thus enabling an input to be received by the key member 110 from a user, and placed with respect to the feedback unit 510, 702 so as to forward the feedback effect generated by the feedback unit 510, 702 to the contact surface.

In 908, the method ends.

Even though the invention has been described above with reference to an example according to the accompanying drawings, it is clear that the invention is not restricted thereto but it can be modified in several ways within the scope of the appended claims.

The invention claimed is:

1. An input arrangement of an electric apparatus, wherein the input arrangement comprises an input device comprising:
    a key member for receiving an input from a user, the key member comprising a plurality of circumferentially arranged touch-sensitive sensor segments and having at least one degree of freedom with respect to the body of the electric apparatus;
    a feedback unit coupled to the key member and configured to generate feedback to the key member for moving the key member or a part of the key member in the direction of the at least one degree of freedom with respect to the electric apparatus as a response to the input; and
    grounded segments between the touch-sensitive sensor segments.

2. The input arrangement of claim 1, wherein the key member is configured to receive a switching force from the user in the direction of the at least one degree of freedom, the input device further comprising at least one switch configured to receive the switching motion from the key member in the direction of the at least one degree of freedom, and wherein the feedback unit is configured to generate the feedback as a response to the switching motion.

3. The input arrangement of claim 2, wherein the key member has a plurality of degrees of freedom, the input device further comprising a plurality of switches, each switch being configured to receive a switching motion from the key member in the direction of the at least one degree of freedom.

4. The input arrangement of claim 1, wherein the feedback unit is configured to generate the feedback as a response to an input via the circumferentially arranged touch-sensitive sensor segments.

5. The input arrangement of claim 1, wherein at least one touch-sensitive sensor segment is a capacitive sensor.

6. The input arrangement of claim 1, wherein at least one touch-sensitive sensor segment comprises a wire sensor.

7. The input arrangement of claim 1, further comprising insulating segments between the grounded segments and the touch-sensitive sensor segments.

8. The input arrangement of claim 1, wherein the physical dimensions of the input device is of the order of the width of a human finger.

9. The input arrangement of claim 1, further comprising a controller unit connected to the touch-sensitive sensor segments and configured to detect the electrical response of each touch-sensitive sensor segments to an input act and configured to combine electric responses of at least two touch-sensitive sensor segments for forming input information.

10. The input arrangement of claim 1, wherein the controller unit is configured to detect the circular direction of the input act by combining electric responses of at least two touch-sensitive sensor segments and to generate a digital signal indicating the direction.

11. The input arrangement of claim 1, wherein the controller unit is configured to detect a simultaneous input act of at least two touch-sensitive sensor segments and to generate a digital signal indicating the simultaneous input act.

12. An electric apparatus comprising an input arrangement, the input arrangement comprising an input device, the input device comprising:
    a key member for receiving an input from a user, the key member comprising a plurality of circumferentially arranged touch-sensitive sensor segments and having at least one degree of freedom with respect to the body of the electric apparatus;
    a feedback unit coupled to the key member and configured to generate feedback to the key member for moving the key member or a part of the key member in the direction of the at least one degree of freedom with respect to the electric apparatus as a response to the input; and
    grounded segments between the touch-sensitive sensor segments.

13. A method of manufacturing an input device of an electric apparatus, the method comprising:
    forming a plurality of circumferentially arranged touch-sensitive sensor segments in a key member having at least one degree of freedom with respect to the body of the electric apparatus, grounded segments being between the touch-sensitive sensor segments;
    placing a feedback unit to the input device, the feedback unit being coupled to the key member; and
    mounting the key member in the input device, thereby enabling an input to be received by the key member from a user and a feedback effect from the feedback unit for moving the key member or a part of the key member in the direction of the at least one degree of freedom with respect to the electric apparatus to be generated by the feedback unit as a response to the input.

* * * * *